United States Patent [19]

Kanari et al.

[11] Patent Number: 5,293,971
[45] Date of Patent: Mar. 15, 1994

[54] SHOCK ABSORBER WITH DAMPING VALVE STRUCTURE HAVING WIDE RANGE VARIABLE DAMPING CHARACTERISTICS

[75] Inventors: Issei Kanari; Junichi Emura, both of Kanagawa, Japan

[73] Assignee: Atsugi Unisia Corporation, Japan

[21] Appl. No.: 69,676

[22] Filed: Jun. 1, 1993

Related U.S. Application Data

[63] Continuation of Ser. No. 388,005, Aug. 1, 1989, abandoned.

[30] Foreign Application Priority Data

Aug. 2, 1988 [JP] Japan .................. 63-103111[U]
Nov. 28, 1988 [JP] Japan .................. 63-154453[U]

[51] Int. Cl.$^5$ .............................................. F16F 9/34
[52] U.S. Cl. ..................... 188/319; 188/299; 188/322.15
[58] Field of Search ............. 188/282, 299, 316, 317, 188/318, 319, 322.13, 322.15, 322.22; 280/707

[56] References Cited

U.S. PATENT DOCUMENTS

| | | | |
|---|---|---|---|
| 4,615,420 | 10/1986 | Mouriay | 188/280 |
| 4,660,689 | 4/1987 | Hayashi | 188/319 |
| 4,671,392 | 6/1987 | Wössner | 188/299 |
| 4,826,207 | 5/1989 | Yoshioka et al. | 188/319 |
| 4,953,671 | 9/1990 | Imaizumi | 188/299 |
| 4,964,493 | 10/1990 | Yamaura et al. | 188/280 |
| 5,044,474 | 9/1991 | de Kock | 188/319 |
| 5,193,655 | 3/1993 | Sasaki et al. | 188/299 |

FOREIGN PATENT DOCUMENTS

| | | |
|---|---|---|
| B130584 | 11/1977 | Australia . |
| A1068290 | 1/1981 | Australia . |
| B50752 | 7/1986 | Australia . |
| B54930 | 11/1987 | Australia . |
| 0196030 | 10/1986 | European Pat. Off. . |
| 0207409 | 1/1987 | European Pat. Off. . |
| 0221602 | 5/1987 | European Pat. Off. . |
| 3711442 | 10/1988 | Fed. Rep. of Germany . |
| 60-22703 | 12/1985 | Japan . |
| 61-164836 | 10/1986 | Japan . |
| 2126687 | 3/1984 | United Kingdom . |
| 2168455 | 6/1986 | United Kingdom . |
| 2180320 | 3/1987 | United Kingdom . |
| 87/07565 | 12/1987 | World Int. Prop. O. . |

Primary Examiner—Robert J. Oberleitner
Assistant Examiner—Chris Schwartz
Attorney, Agent, or Firm—Ronald P. Kananen

[57] ABSTRACT

A variable damping characteristics shock absorber includes a piston provided with first and second disc valves. Within a piston, an annular space is defined between the first and second disc valves. The annular space is selectively communicated with upper and lower fluid chambers defined in a shock absorber cylinder tube via a by-pass path. A variable orifice formed by means of a rotary valve is provided in the by-pass path.

8 Claims, 6 Drawing Sheets

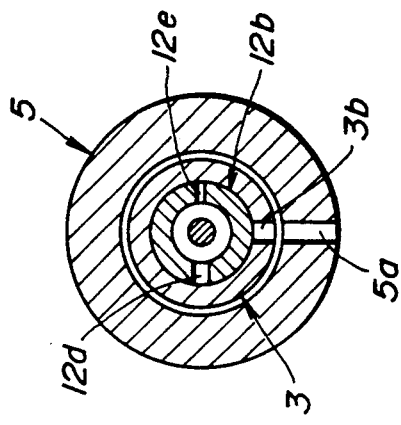
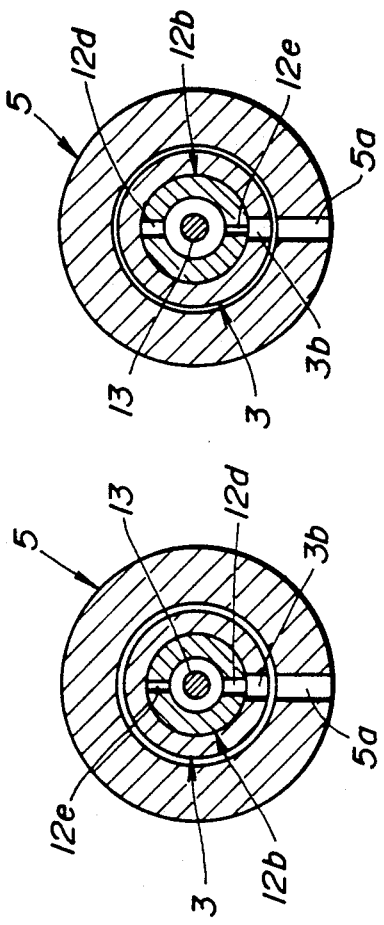
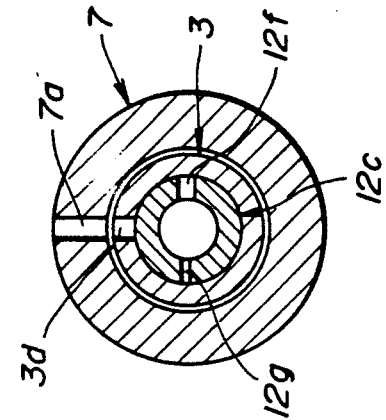
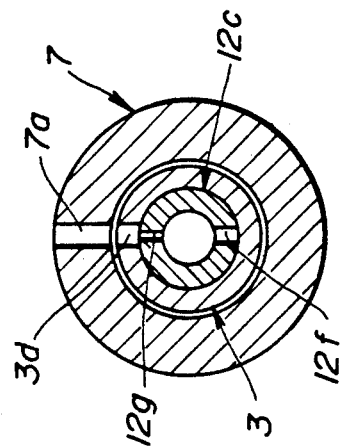
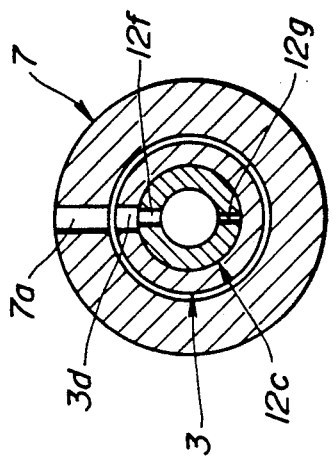

SHOCK ABSORBER WITH DAMPING VALVE STRUCTURE HAVING WIDE RANGE VARIABLE DAMPING CHARACTERISTICS

This application is a continuation of application Ser. No. 07/388,005 filed Aug. 1, 1989, now abandoned.

BACKGROUND OF THE INVENTION

1. Field of the Invention

The present invention relates generally to a shock absorber having variable damping characteristics. More specifically, the invention relates to a variable damping characteristics valve assembly, which is suitable for use in an automotive suspension system.

2. Description of the Background Art

Japanese Patent First (unexamined) Publication (Tokkai) Showa 58-81243 discloses a shock absorber having two way damping characteristics for both piston bounding and rebounding strokes. In order to provide variable damping characteristics for both in piston bounding and rebounding strokes, a first piston has a first bounding and rebounding damping valve, and a second piston has a second bounding and rebounding damping valve. The first and second pistons are arranged in tandem fashion. An intermediate chamber is defined between the first and second pistons. The intermediate chamber is selectively connected to upper and lower fluid chambers of the shock absorber via a switching valve. By switching a fluid connection between the intermediate chamber and one of the upper and lower fluid chambers only one of the first and second bounding and rebounding values in one of the first and second pistons is active for generating damping force.

With the shown construction, since the intermediate chamber is common for both piston bounding and rebounding strokes, it is not possible to control damping characteristics for the piston bounding stroke and the piston rebounding stroke independent of each other. Furthermore, in the shown construction, since first and second pistons are required, the number of parts is unnecessarily great, causing higher cost and requiring complex assembling operation, which causes inefficiency in manufacturing. In addition, due to the presence of the first and second damping valves in the first and second damping pistons, the overall length of the shock absorber becomes excessive.

On the other hand, Japanese Patent First (unexamined) Publication (Tokkai) Showa 58-116213 discloses a variable damping characteristics shock absorber. The shown shock absorber is provided with a damping valve for a piston bounding or compression stroke, which damping valve will be hereafter referred to as the "bounding stroke damping valve" and a damping valve for piston rebounding or expansion stroke, which will be hereafter referred to as "rebounding stroke damping valve. One or more fluid passages are provided in parallel to the aforementioned damping valves. A non-return valve is disposed in the fluid path for permitting fluid flow only in the piston bounding stroke. A by-pass passage is formed by-passing the non-return valve. A variable orifice is provided in the by-passing passage for restricting the fluid flow rate through the by-pass passage. The variable orifice is formed by means of a rotary valve. The rotary valve is rigidly coupled with a control rod which can be rotatingly driven for adjusting the damping characteristics.

With the construction set forth above, the working fluid in a lower fluid chamber of the shock absorber flows through bounding stroke damping valve, through the variable orifice and through the non-return valve during the piston bounding or compression stroke. In each of the working fluid flow routes set forth above, a restriction for the fluid flow is provided for generating damping force.

SUMMARY OF THE INVENTION

Therefore, it is an object of the present invention to provide a variable damping characteristics hydraulic shock absorber which can solve the drawback in the prior proposed variable damping characteristics shock absorber.

Another object of the invention is to provide a variable damping characteristics shock absorber which can provide a wide range variation of damping characteristics, which range is much wider than that in the prior proposed shock absorbers.

A further object of the present invention is to permit the variable damping characteristics shock absorber to adjust the damping characteristics independently of respective piston stroke direction.

In order to accomplish the aforementioned and other objects, a variable damping characteristics shock absorber, according to the present invention, includes a piston provided with first and second disc valves. Within a piston, an annular fluid space is defined between the first and second disc valves. The annular fluid space is selectively communicated with upper and lower fluid chambers defined in a shock absorber cylinder tube via by-pass path. A variable orifice formed by means of a rotary valve is provided in the by-pass path.

According to one aspect of the invention, a damping valve assembly for a hydraulic shock absorber having a hollow cylinder, a piston rod, a piston fixed to the piston rod for movement therewith and disposed within the internal space of the cylinder for dividing the internal space into first and second fluid chambers respectively filled with a working fluid, and a communication path defined through the piston for establishing fluid communication between the first and second fluid chambers, the damping valve assembly comprises:

the communication path including a first passage component and second, passage component cooperative with the first passage component for permitting fluid flow from the first fluid chamber to the second fluid chamber during a piston stroke compressing the first chamber;

first flow restriction means responsive to fluid pressure in the first passage component, for adjusting a first path area at one end of the first passage component;

second flow restriction means adjusting fluid flow through the second passage component, the second flow restriction means including a variable orifice means for adjusting a fluid flow rate through the second passage component, the variable orifice means being variable of flow path at least between a first fully closed position and a second flow restricting position for permitting fluid flow in a limited flow rate.

The second flow restriction means may further include a resilient valve member responsive to the fluid pressure in the second passage component for adjusting the second path area at one end of the second passage component. The second passage component may include a third passage component of the communication path for by-passing the resilient valve member for establishing direct connection between upstream of the resilient valve member and the second fluid chamber for permitting fluid flow therethrough and the variable orifice means is provided in the third passage component. The first flow restriction means comprises a resilient valve member.

The first and second passage components may be arranged in series, and the resilient valve members of the first and second flow restriction means define an annular space therebetween, and the third passage component connects the annular space to the second chamber by-passing the resilient valve member of the second flow restriction means. The by-pass passage may have a portion extending through the piston rod. The variable orifice comprises a stationary passage component forming a part of the by-pass passage and a movable passage component which is movable between a first position in alignment with the stationary passage component and a second position offset from the stationary passage component. The movable component comprises an opening formed through a rotary valve which by rotating varies the angular position of the opening between the first and second positions.

The rotary valve may define a first movable passage component and a second movable passage component defining a path area smaller than that of the first movable passage component, the rotary valve being driven at a first angular position where both of the first and second movable passage components are out of alignment with the stationary component for completely blocking fluid flow through the by-pass path, a second angular position where the first movable passage component is aligned with the stationary component for minimum flow restriction, and a third angular position where the second movable passage component is aligned with the stationary component for flow restriction at greater magnitude than that at the second angular position.

In the alternative, the variable orifice may comprise a stationary passage component forming a part of the by-pass passage and a movable passage component which is movable between a first position in alignment with the stationary passage component and a second position placed offset from the stationary passage component. The first disc valve is placed in opposition to one end of the communication path for openably closing the associated end, a spacer ring is disposed between the first and second disc valves for defining therebetween the annular space, the spacer ring defines the stationary passage component therethrough, and the movable passage component is defined through a movable member disposed within the piston rod for selectively establishing and blocking fluid communication between the annular space and the portion extending through the piston rod.

The second disc valve operably closes the annular space for selectively establishing fluid communication between the first chamber and the annular space. The first and second passage components are essentially parallel to each other.

According to another aspect of the invention, a damping valve assembly for a hydraulic shock absorber having a hollow cylinder, a piston rod, a piston fixed to the piston rod for movement therewith and disposed within the internal space of the cylinder for dividing the internal space into first and second fluid chambers respectively filled with a working fluid, and a communication path defined through the piston for establishing fluid communication between the first and second fluid chambers, comprises:

first and second disk valves disposed within the communication path in tandem fashion;

an annular space defined between the first and second disc valves;

a by-pass passage defined for by-passing the first disc valve for establishing direct communication between the first fluid chamber and the annular space; and a variable orifice provided within the by-pass passage for adjusting fluid flow rate through the by-pass passage.

According to a further aspect of the invention, a piston assembly for a hydraulic shock absorber having a hollow cylinder, a piston rod to which the piston is fixed for movement therewith, the piston being disposed within the internal space of the cylinder for dividing the internal space into first and second fluid chambers respectively filled with a working fluid, and defining fluid communication between the first and second fluid chambers, comprises:

a first fluid path means for permitting fluid flow from the first chamber to the second chamber during a piston stroke compressing the first chamber;

a first flow restricting means associated with one end of the first fluid path for resiliently closing the one end, the first flow restricting means being responsive to a fluid pressure in the first fluid path overcoming the resilient force thereof for forming a first flow restricting path for permitting a limited magnitude of fluid flow therethrough from the first chamber to the second chamber;

a second fluid path means for permitting fluid flow from the first chamber to the second chamber during the piston stroke compressing the first chamber;

a second flow restricting means associated with the second fluid path for varying the path area thereof for causing flow restriction, the second flow restriction means being operable at least between a first position for completely blocking fluid communication from the second fluid passage means and a second position for permitting fluid flow through the second fluid passage in a controlled magnitude of flow rate.

BRIEF DESCRIPTION OF THE DRAWINGS

The present invention will be understood more fully from the detailed description given herebelow and from the accompanying drawings of the preferred embodiments of the invention, which, however, should not be taken to limit the invention to the specific embodiment or embodiments, but are for explanation and understanding only.

In the drawings:

FIGS. 2 through 4 are cross-sections showing the construction of a fluid path defined in the first embodiment of the shock absorber, active during a piston bounding stroke;

FIGS. 5 through 7 are cross-sections showing the construction of a fluid path defined in the first embodiment of the shock absorber, active during a piston rebounding stroke;

DESCRIPTION OF THE PREFERRED EMBODIMENT

Figure 1:
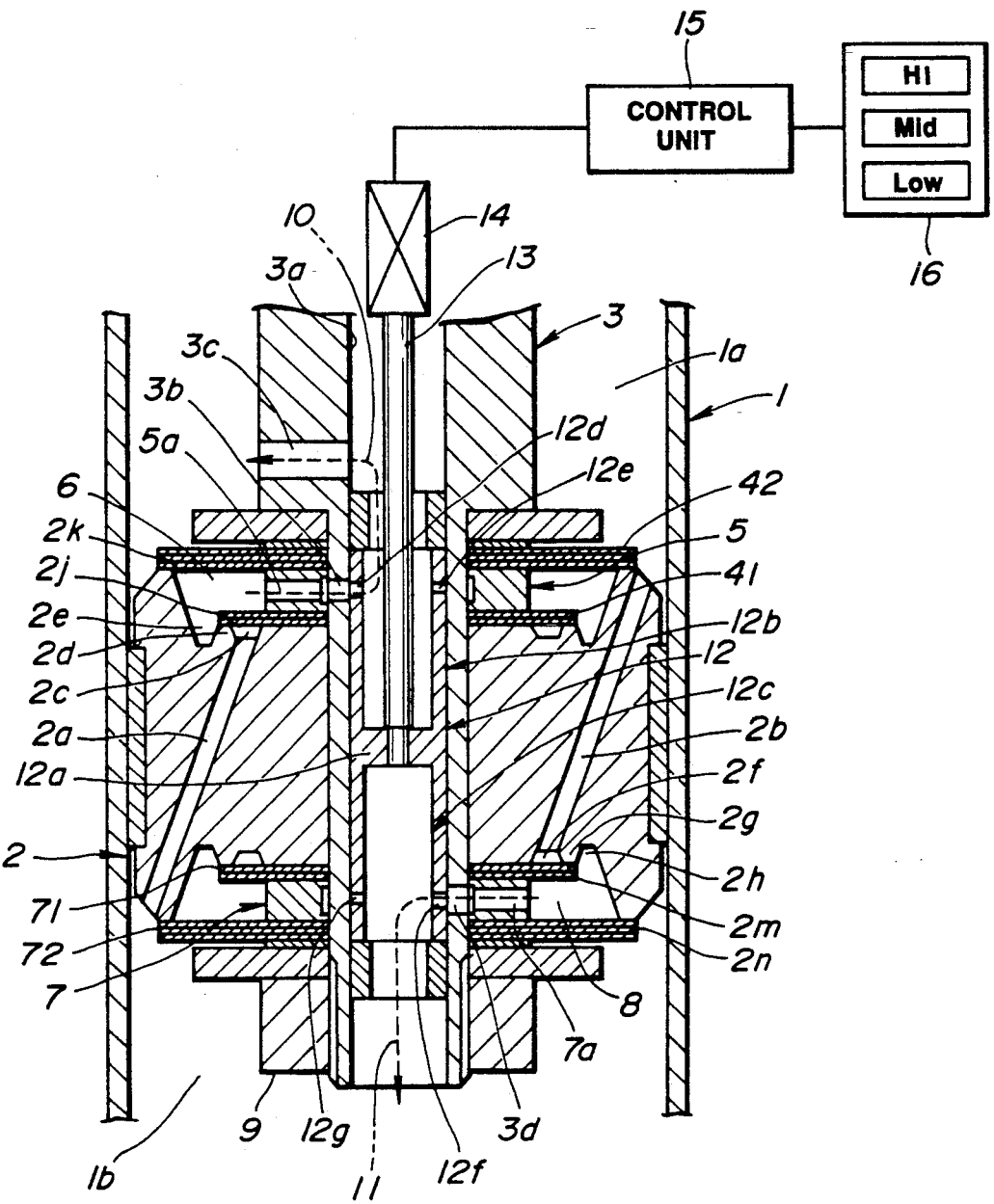
FIG. 1 is a partial section of the first embodiment of a variable damping characteristics shock absorber according to the present invention.

Referring now to the drawings, particularly to FIG. 1, the first embodiment of a variable damping characteristics shock absorber, according to the present invention, defines an internal space filled with a working fluid within a cylinder tube 1. A piston 2 is disposed within the internal space of the cylinder tube 1 and separates the internal space into upper and lower fluid chambers 1a and 1b. The piston 2 is connected to the lower end of a piston rod 3. The piston rod 3 extends through the cylinder tube 1 and connects to a vehicular body at its upper end. On the other hand, the cylinder tube 1 is connected to a suspension member which rotatably supports a road wheel.

The piston 2 defines a first communication path 2a and a second communication path 2b. These communication paths 2a and 2b are arranged in parallel to each other. The first communication path 2a has a lower end exposed to the lower fluid chamber 1b and opening in the vicinity of the circumferential edge portion of the piston 2. The upper end of the path 2a opens to an annular groove 2c formed on the upper surface of the piston 2. The annular groove 2c extends in parallel to an annular groove 2e and is separated therefrom by an annular land 2d. On the other hand, the second communication path 2b has an upper end exposed to the upper fluid chamber 1a in the vicinity of the upper circumferential edge portion of the piston 2. The lower end of the path 2b is communicated with an annular groove 2f formed on the lower surface of the piston. The annular groove 2f is formed in parallel relationship with an annular groove 2h separated therefrom by an annular land 2g.

Opposing the upper surface of the piston 2, a bounding stroke damping valve assembly including a first bounding stroke damping valve 41 and a second bounding stroke damping valve 42 is provided. Similarly, opposing the lower surface of the piston 2, a rebounding stroke damping valve assembly including a first rebounding stroke damping valve 71 and a second rebounding stroke damping valve 72 is provided. The damping valves 41, 42 and 71, 72 are fixedly mounted on the piston rod 3 together with the piston 2, by means of a fastening nut 9.

Both of the first and second bounding stroke damping valves 41 and 42 are provided for establishing fluid communication between the first communication path 2a and the upper fluid chamber 1a. Specifically, the first bounding stroke damping valve 41 is seated on a valve seat surface 2j for closing the upper end of the annular groove 2c. As seen from FIG. 1, the second bounding stroke damping valve 42 is provided in spaced apart relationship to the first bounding stroke damping valve 41 via a spacer ring 5. The second bounding stroke damping valve 42 is seated on a seat surface 2k formed on the outer circumferential land. Between the first and second bounding stroke damping valves 41 and 42, a bounding stroke annular space 6 is defined.

In a manner similar to the bounding stroke damping valves 41 and 42, the rebounding stroke damping valves 71 and 72 are respectively seated on seat surfaces 2m and 2n. An annular spacer ring is disposed between the rebounding stroke damping valves 71 and 72 for defining a rebounding stroke annular space 8 between the rebounding stroke damping valves.

In order to communicate the upper fluid chamber 1a with the bounding stroke annular space 6, a bounding stroke bypass passage 10 is defined. The bounding stroke bypass passage 10 comprises a radial path 5a defined in the spacer ring 5, an axial, bore 3a defined in the piston rod 3 communicated with the radial path via a radial opening 3b formed through the piston rod wall, and a radial opening 3c opening the outer end thereof to the upper fluid chamber 1a.

In a manner similar to the above, a rebounding stroke bypass passage 11 is defined for establishing, fluid communication between the rebounding stroke annular space 8 and the lower fluid chamber 1b. The rebounding stroke bypass passage 11 comprises a radial path 7a defined through the spacer ring 7, the axial bore 3a, and a radial opening 3d.

An essentially cylindrical rotary valve 12 is disposed within the axial bore 3a for rotation therein. The rotary valve 12 defines a hollow space therein which is separated into an upper section and a lower section by a partition 12a. The upper section serves as a damping characteristics switching valve for the piston bounding stroke, and the lower section serves as a damping characteristics switch valve for the piston rebounding stroke. A bounding stroke SOFT mode orifice 12d and a bounding stroke MEDIUM mode orifice 12e are formed through circumferentially offset portions to each other in the upper section of the rotary valve 12. As will be appreciated, the bounding stroke SOFT mode orifice 12d defines a greater path area than the bounding stroke MEDIUM mode orifice 12e, as shown in FIGS. 2 through 4. The fluid flow path area of the bounding stroke MEDIUM mode orifice 12e is so determined as to provide smaller flow restriction than is provided by the second bounding stroke damping valve 42 so that the damping force to be created in the orifice 12 is to be smaller than that of the second bounding stroke damping valve.

Similarly to the above, rebounding stroke SOFT mode orifice 12f and rebounding stroke MEDIUM mode orifice 12g are formed through circumferentially offset portions to each other in the lower section of the rotary valve 12. As will be appreciated, the rebounding stroke SOFT mode orifice 12f defines a greater path area than the rebounding stroke MEDIUM mode orifice 12g, as shown in FIGS. 5 through 7. The fluid flow path area of the rebounding stroke MEDIUM mode orifice 12f is so determined as to provide smaller flow restriction than is provided by the second rebounding stroke damping valve 72 so that the damping force to be created in the orifice 12 is to be smaller than that of the second rebounding stroke damping valve.

The rotary valve 12 is rigidly fixed to the lower end of the rotary shaft 13 which is rotatingly driven by means of a driving actuator 14 which may comprise an electric motor. The driving actuator 14 is electrically connected to a mode selector switch 16 which is manually operable for selecting the damping mode of the shock absorber. As is shown, the mode selector switch 16 in the shown embodiment can be operated between three mode positions, i.e. HARD mode position, MEDIUM mode position and SOFT mode position. The mode selector switch 16 generates a mode selector command for driving the actuator 14 to place the rotary valve 12 at a predetermined angular position corresponding to one of the selected damping modes specifically, when the HARD mode is selected, the rotary valve 12 is placed at an angular position where all of the orifices 12d, 12e and 12f and 12g are out of communication with the radial openings 3c and 3d of the piston rod, as shown in FIGS. 4 and 7. Therefore, at %his rotary valve position, fluid communication through each of the bounding and rebounding stroke bypass passages 10 and 11 is blocked. At this time, the working fluid in the annular spaces 6 and 8 flows only through the corresponding one of the second bounding stroke damping valve 42 and the second rebounding stroke damping valve 72. As a result, the path area for the working fluid to flow between the upper and lower fluid chambers becomes minimum for generating the greatest damping force.

When the rotary valve 12 is in the HARD mode position, the working fluid in the lower fluid chamber 1b flows through the first communication path 2a, the annular groove 2c, a flow restricting gap formed between the circumferential edge of the first bounding stroke damping valve 41 and the seat surface 2j, the bounding stroke annular space 6 and the flow restricting gap formed between the circumferential edge of the second bounding stroke damping valve 42 and the seat surface 2k, during piston bounding stroke. On the other hand, the working fluid in the upper fluid chamber 1a flows into the lower fluid chamber 1b via the second communication path groove 2b, the annular groove 2f, the flow restricting gap formed between the circumferential edge of the first rebounding stroke damping valve 71 and the seat surface 2m, the rebounding stroke annular space 8, and the flow restricting gap formed between the circumferential edge of the second rebounding stroke damping valve 72 and the seat surface 2n during piston rebounding stroke.

When the SOFT mode is commanded through the mode selector switch 16, the rotary valve 12 is driven to rotate to the angular position for aligning the bounding and rebounding stroke SOFT mode orifices 12d and 12f with the radial openings 3b and 3d, as shown in FIGS. 2 and 5. Then, the flow path for the working fluid flowing between the upper and lower fluid chamber via one of the communication paths 10 and 11 becomes maximum for minimum fluid flow resistance. At the same time, since corresponding bounding and rebounding annular spaces 6 and 8 communicate with the upper and lower fluid chambers 1a and 1b via the stroke damping valves 42 and 41, the overall fluid flow path area defined by placing the rotary valve at the SOFT mode position becomes maximum for the smallest damping force to be produced.

When the rotary valve 12 is in the SOFT mode position, the working fluid in the lower fluid chamber 1b flows into the upper fluid chamber 1a through two routes during the piston bounding stroke. One route extends through the first communication path 2a, the annular groove 2c, a flow restricting gap formed between the circumferential edge of the first bounding stroke damping valve 41 and the seat surface 2j, the bounding stroke annular space 6 and the flow restricting gap formed between the circumferential edge of the second bounding stroke damping valve 42 and the seat surface 2k, during piston bounding stroke. The other route is established through the bounding stroke communication path 10 extending from the bounding stroke annular space 6 and the upper fluid chamber 1a via the bounding stroke SOFT mode orifice 12d. On the other hand, the working fluid in the upper fluid chamber 1a flows into the lower fluid chamber 1b through two routes during the piston rebounding stroke. One route is established through the second communication path 2b, the annular groove 2f, the flow restricting gap formed between the circumferential edge of the first rebounding stroke damping valve 71 and the seat surface 2m, the rebounding stroke annular space 8, and the flow restricting gap formed between the circumferential edge of the second rebounding stroke damping valve 72 and the seat surface 2n. The other route is established through the rebounding stroke bypass passage 11 via the rebounding mode SOFT stroke orifice 12f.

Similarly, when the MEDIUM mode is commanded through the mode selector switch 16, the rotary valve 12 is driven to rotate to the angular position for aligning the bounding and rebounding stroke MEDIUM mode orifices 12E and 12G with the radial openings 3b and 3d, as shown in FIGS. 3 and 6. Then, the flow path for the working fluid flowing between the upper and lower fluid chamber via one of the communication paths 10 and 11 becomes smaller than that in the SOFT mode for greater fluid flow resistance. At the same time, since corresponding bounding and rebounding annular spaces 6 and 8 communicate with the upper and lower fluid chambers 1a and 1b via the stroke damping valves 42 and 72, the overall fluid flow path are defined by placing the rotary valve at the MEDIUM mode position becomes smaller than that in the SOFT mode for the medium damping force to be produced. In this mode, the secondary routes discussed with respect to the SOFT mode fluid flow are established via the bounding and rebounding stroke MEDIUM mode orifices 12e and 12g in place of the orifices 12d and 12f.

It should be appreciated that, though the shown embodiment is directed to manual selection of the damping characteristics of the shock absorber through the manually operable mode selector switch, it may be possible to command the damping mode in automatic manner depending upon vehicle driving conditions, such as vehicular speed, vehicular acceleration and deceleration magnitude, lateral force to be exerted on the vehicle, rolling magnitude and so forth.

Figure 8:
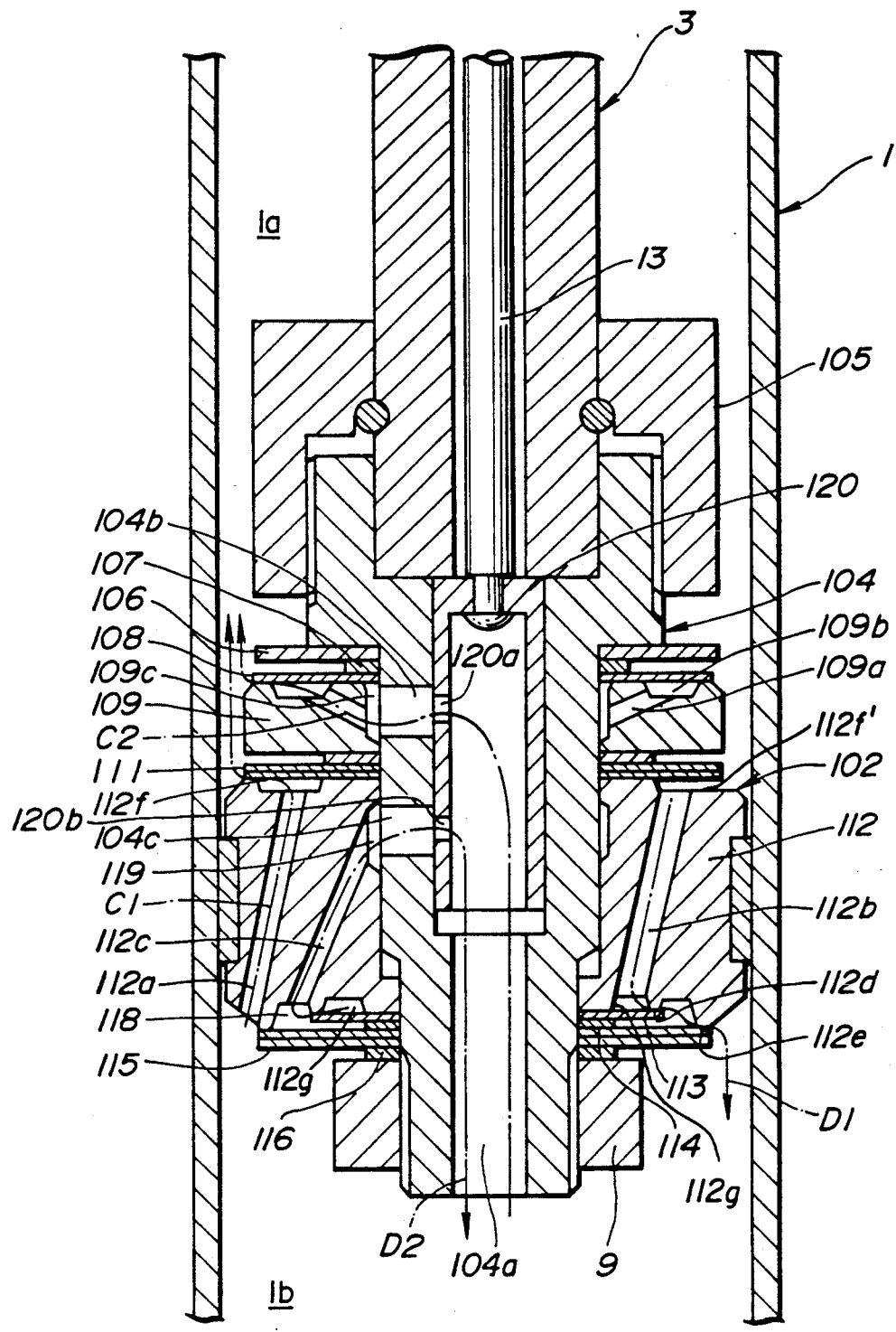
FIG. 8 is a partial section of the second embodiment of a variable damping characteristics shock absorber according to the present invention.

FIG. 8 shows a second embodiment of the variable damping characteristics shock absorber according to the present invention. The shown embodiment is different from the former embodiment in the construction of the piston assembly and the fluid path. In the shown embodiment, the piston assembly includes first and second piston bodies 109 and 112 provided in axial alignment with each other and mounted on the lower end of the piston rod 3 via a stud 104 engaging with a fastening nut 105 which is rigidly fixed to the lower end of the piston rod 3. The first piston body 109 is formed with an annular groove 109b on the upper surface thereof. The annular space 109b is closed by a second bounding stroke damping disc valve 108 mounted with a ring washer 107 and a retainer disc 106. The outer end of a radially extending bounding stroke bypass passage 109a opens to the annular groove 109b. The inner end of the radially extending opening 109a opens to an annular chamber 109c defined by the inner circumference of the first piston body 109 and the central portion of the damping disc valve 108. The annular chamber 109c is communicated with an axially extending bore 104a defined in the stud 104 via a radial path 104b and an upper radial opening 120a formed through a rotary valve body 120.

On the other hand, the second piston body 112 is formed with a bounding stroke communication path 112a, a rebounding stroke first communication path 112b and a rebounding stroke second communication path opening 112c. The lower end of the bounding stroke communication path opening 112a is exposed to the lower fluid chamber 1b. On the other hand, the upper end of the bounding stroke communication path 112a is opened to a groove 112f formed on the upper surface of the second piston body 112, which annular groove 112f is closed by a first bounding stroke damping disc valve 111 and thus in fluid communication with the upper fluid chamber 1a as this valve 111 opens. On the other hand, the rebounding stroke first communication path 112b has an upper end opening to a radially extending cut-out 112f, and a lower end opening to an inner annular groove 112g. A rebounding stroke bypass passage 112c opens to an annular chamber 119 defined between the inner circumference of the piston body 112 and the outer periphery of the stud 104 at the upper end, which annular chamber 119 is in fluid communication with the axial bore 104a via a radial path 104c and the lower radial opening 120b, and to the outer annular groove 118 at the lower end thereof. The inner annular groove 112g is closed by a first rebounding stroke damping disc valve 113. The outer annular space 118 is closed by a second damping disc valve 115. A spacer ring 114 is positioned between the first damping disc valve 113 and the second damping disc valve 115.

A first passage component includes the bounding stroke communication path 112a extending from the lower fluid chamber 1b to the groove 112f. A second passage component has two branches, a first branch from the annular space 118, past the disc valve 115 to the lower fluid chamber 1b, and a second branch from the annular space 118 through the bounding stroke bypass passage 112c, the radial path 104c the orifice 120b and the axial bore 104a. The second branch of the second passage component comprises a third passage component, which defines a bypass passage bypassing the disk valve 115.

With the shown construction, the working fluid in the lower fluid chamber 1b flows into the upper fluid chamber 1a through two routes $C_1$ and $C_2$ during the piston bounding stroke. On the other hand, the working fluid in the upper fluid chamber 1a flows into the lower fluid chamber through two routes $D_1$ and $D_2$ during the piston rebounding stroke.

Figure 9:
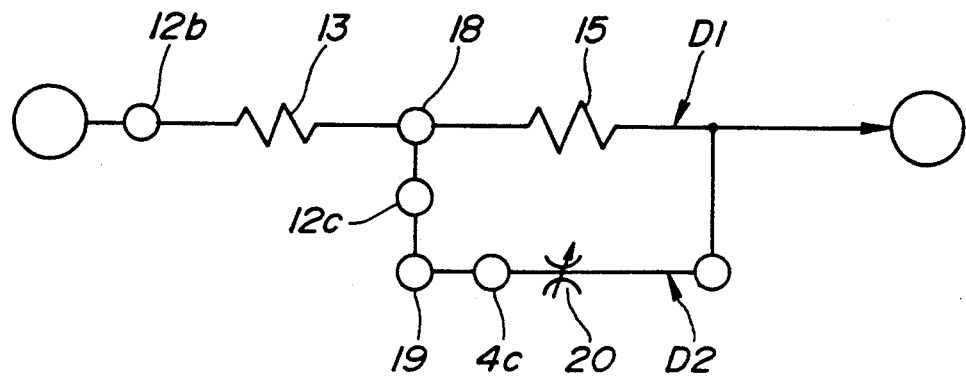
FIG. 9 is an illustration showing a fluid flow route during a piston rebounding stroke.
Figure 10:
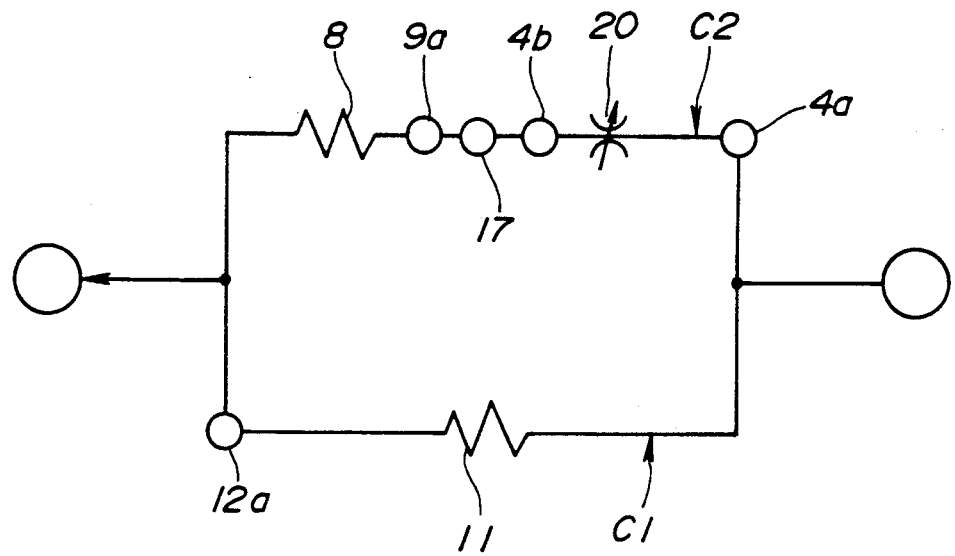
FIG. 10 is an illustration showing a fluid flow route during a piston bounding stroke.

FIG. 9 explanatorily shows the routes $D_1$ and $D_2$ for permitting fluid flow from the upper fluid chamber 1a to the lower fluid chamber 1b in the piston rebounding stroke. As can be seen from FIG. 9, the second route $D_2$ in the rebounding stroke is established through the rebounding stroke communication path 112b, the annular groove 112g, the gap formed between the first rebounding stroke damping disc valve 113 and a seat surface 112d, the annular space 118, the rebounding stroke bypass passage 112c, the annular chamber 119, the radial path 104c, the radial orifice 120b and the axial base 104a. The first route $D_1$ is established by a gap formed between the second rebounding stroke damping disc valve 115 and the seat surface 112e, which gap establishes fluid communication between the annular groove 118 and the lower fluid chamber 1b. On the other hand, FIG. 10 explanatorily shows the routes $C_1$ and $C_2$ for permitting fluid flow from the lower fluid chamber 1b to the upper fluid chamber 1a in the piston bounding stroke. As can be seen from FIG. 10, the first route $C_1$ in the bounding stroke is established through the bounding stroke communication path 112a, the groove 112f and a gap formed between the first bounding stroke damping disc valve 111. The second route $C_2$ is established through the axial bore 104a, the lower radial orifice 120a, the radial path 104b, the radially extending rebounding stroke bypass passage 109a, a gap formed between the circumferential edge of the second bounding stroke damping disc valve 108 and the seat surface of the first piston body 109.

Figure 11:
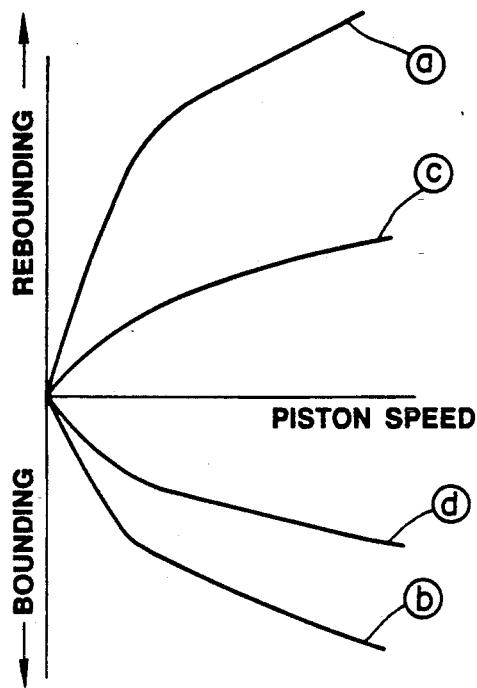
FIGS. 11 and 12 show damping characteristics varying depending upon piston stroke speed in the second embodiment of the shock absorber of the present invention and in the prior art.
Figure 12:
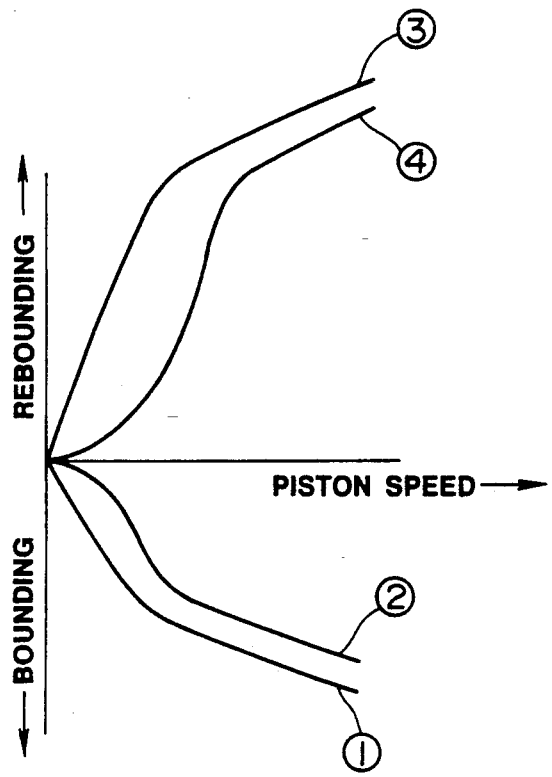

Here, the second bounding stroke damping disc valve 108 has a small stiffness for providing low damping characteristics. Similarly, first rebounding stroke damping disc valve 113 has a smaller stiffness than the second rebounding stroke damping disc valve 115. Though it is not clearly shown in the drawings, the rotary valve 120 is provided with a plurality, of radial orifices having mutually different path areas to be selectively aligned so that the path area for the fluid flow can be varied for providing variable damping characteristics. The rotary valve 120 may also be placed at an angular position for completely blocking fluid flow. In such case, the second routes $D_2$ and $C_2$ are shut down in rebounding and bounding stroke. Therefore, the harder damping characteristics can be obtained by permitting the fluid flow only through the first routes $D_1$ and $C_1$ in the rebounding and bounding strokes, respectively, of the piston. Therefore, even when the rotary valve 120 is provided with only one sets of radial orifices 120a and 120b, respective two way damping characteristics in the bounding and rebounding strokes can be obtained as shown by lines (a) through (d) in FIG. 11. The characteristics in FIG. 11 shows substantial improvement achieved in comparison with that in the prior art as shown in lines (1) through (4) of FIG. 12.

Figure 13:
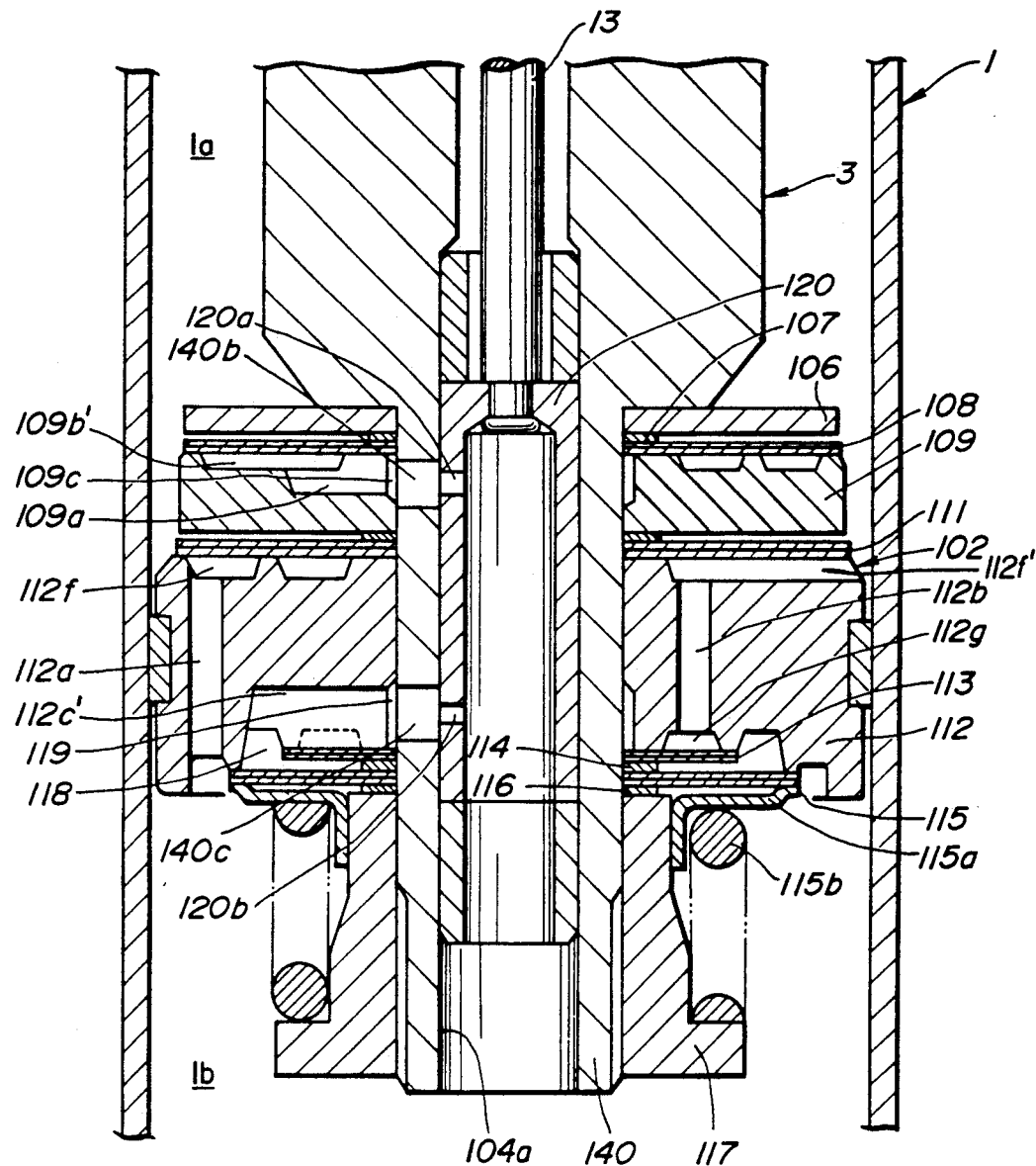
FIG. 13 is a partial section of the third embodiment of a variable damping characteristics shock absorber according to the present invention.

FIG. 13 shows a third embodiment of the variable damping force shock absorber according to the present invention. This embodiment is derived from modification of the foregoing second embodiment. In this embodiment, a smaller diameter extension 140 is provided in place of the stud 104 in the second embodiment. This clearly reduces parts for forming the shock absorber and thus reduces production steps and costs Furthermore, according to the shown embodiment, the radial extending path 109a and the communication path opening 112c are replaced with grooves 109b' and 112c' formed on the surfaces of the first and second piston bodies 109 and 112. By this, production process can be simplified to be easily performed.

As can be seen from FIG. 13, the shown embodiment is formed with the communication paths 112a and 112b in parallel to the axis of the piston rod. This makes machining or molding of the shaped piston easy.

In addition, the shown embodiment is provided with a retainer 115a mating with the disc valve 115. The retainer 115a is biased upwardly to constantly urge the establishment of to steady and constant contact between the retainer and the disc valve 115 by means of a coil spring.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. In a damping valve assembly;
    a cylinder tube with an internal space containing a working fluid;
    a piston rod extending into said internal space and having a piston fixed thereto, said piston being disposed within said internal space to separate said internal space into a first fluid chamber and a second fluid chamber, said piston rod having an axial bore in fluid communication with said second fluid chamber and a radial opening in fluid communication with said axial bore;
    said piston having a first end adjacent said first fluid chamber and a second end, opposite to said first end adjacent said second fluid chamber, said second end of said piston being formed with an outer annular groove and an inner annular groove which is separated from said outer annular groove by an annular land;
    said piston having a communication path having one end in fluid communication with said first fluid chamber and an opposite end in fluid communication with said inner annular groove;
    a first damping valve mounted to said piston and seated on said annular land to cover said inner annular groove;
    a second damping valve mounted to said piston in spaced relationship with said first damping valve and cooperating with said first damping valve to define therebetween an annular space in fluid communication with said outer annular groove;
    said first damping valve being operative to permit a fluid communication between said inner groove and said annular space during a piston stroke wherein said first fluid chamber is compressed and said second fluid chamber is expanded,
    said second damping valve being operative to permit a fluid communication between said annular space and said second fluid chamber during said piston stroke;
    said piston having a bypass passage having one end in fluid communication with said annular space and an opposite end in fluid communication with said radial opening of said piston rod; and
    a cylindrical rotary valve rotatably disposed in said axial bore and having a position in which said cylindrical rotary valve covers said radial opening, said cylindrical rotary valve having an orifice, said cylindrical rotary valve having another position in which said orifice is in fluid communication with said radial opening to establish a fluid communication between said annular space and said axial bore of said piston rod.

2. A damping valve assembly as claimed in claim 1, wherein said one end of said bypass passage is open at said outer annular groove.

3. A damping valve assembly as claimed in claim 1, which further comprises a spacer ring disposed between said first and second damping valves to keep said spaced relationship, said spacer ring being formed with said bypass passage.

4. A damping valve assembly comprising:
    a cylinder tube with an internal space containing a working fluid;
    a piston rod extending into said internal space;
    a piston fixedly mounted to said piston rod and disposed within said internal space to separate said internal space into a first fluid chamber and a second fluid chamber;
    said piston having a first communication path and a second communication path, said first communication path having one end in fluid communication with said second fluid chamber and an opposite end adjacent to said first fluid chamber, said second communication path having one end in fluid communication with said first fluid chamber and an opposite end adjacent to said second fluid chamber;
    a first damping valve closing said opposite end of said second communication path;
    a second damping valve;
    means on said piston and seated by said second damping valve for defining a first annular space in cooperation with said first and second damping valves;
    said first annular space being communicable with said opposite end of said second communication path via said first damping valve and also with said second fluid chamber via said second damping valve during a first piston stroke of said piston compressing said first fluid chamber;
    means for defining a first bypass passage establishing fluid communication between said first annular space and said second fluid chamber;
    said opposite end of said first communication path opening to a first annular groove with which a first axial end surface of said piston which is adjacent to said first fluid chamber is formed, while said opposite end of said second communication path opening to a second annular groove with which a second axial end surface of said piston which is adjacent to said second fluid chamber is formed;
    said first annular space defining means being on said second axial end surface of said piston;
    a third damping valve closing said first annular groove;
    a fourth damping valve spaced from said third damping valve;
    means on said first axial end surface of said piston and seated by said fourth damping valve for defining a second annular space in cooperation with said third and fourth damping valves;
    said second annular space being communicable with said first annular groove via said third damping valve and also with said first fluid chamber via said fourth damping valve;
    means for defining a second bypass passage establishing fluid communication between said second annular space and said first fluid chamber; and
    a flow rate controlling valve fluidly disposed in said first and second passages.

5. A damping valve assembly comprising:
    a cylinder tube with an internal space containing a working fluid;
    a piston rod extending into said internal space;
    a piston fixedly mounted to said piston rod and disposed within said internal space to separate said internal space into a first fluid chamber and a second fluid chamber;

said piston having a first communication path and a second communication path, said first communication path having one end in fluid communication with said second fluid chamber and an opposite end adjacent to said first fluid chamber, said second communication path having one end in fluid communication with said first fluid chamber and an opposite end adjacent to said second fluid chamber;

a first damping valve closing said opposite end of said second communication path;

a second damping valve;

means on said piston and seated by said second damping valve for defining a first annular space in cooperation with said first and second damping valves;

said first annular space being communicable with said opposite end of said second communication path via said first damping valve and also with said second fluid chamber via said second damping valve during a first piston stroke of said piston compressing said first fluid chamber;

means for defining a first bypass passage establishing fluid communication between said first annular space and said second fluid chamber;

a third damping valve;

a fourth damping valve closing said opposite end of said first communication path, said opposite end of said first communication path being communicable with said first fluid chamber via said fourth damping valve during a second piston stroke of said piston compressing said second fluid chamber;

means for defining a second bypass passage having one end in fluid communication with said second fluid chamber and an opposite end closed by said third damping valve, said opposite end of said second bypass passage being communicable with said first fluid chamber via said third damping valve during said second piston stroke; and a flow rate controlling valve fluidly disposed in said first and second bypass passages.

6. A damping valve assembly comprising:

a cylinder tube with an internal space containing a working fluid;

a piston rod extending into said internal space;

a piston fixedly mounted to said piston rod and disposed within said internal space to separate said internal space into a first fluid chamber and a second fluid chamber;

said piston having a first communication path and a second communication path, said first communication path having one end in fluid communication with said second fluid chamber and an opposite end adjacent to said first fluid chamber, said second communication path having one end in fluid communication with said first fluid chamber and an opposite end adjacent to said second fluid chamber;

a first damping valve closing said opposite end of said second communication path;

a second damping valve;

means on said piston and seated by said second damping valve for defining a first annular space in cooperation with said first and second damping valves;

said first annular space being communicable with said opposite end of said second communication path via said first damping valve and also with said second fluid chamber via said second damping valve during a first piston stroke of said piston compressing said first fluid chamber;

means for defining a first bypass passage establishing fluid communication between said first annular space and said second fluid chamber;

said opposite end of said first communication path opening to a first annular groove with which a first axial end surface of said piston which is adjacent to said first fluid chamber is formed, while said opposite end of said second communication path opening to a second annular groove with which a second axial end surface of said piston which is adjacent to said second fluid chamber is formed;

a third damping valve;

a fourth damping valve closing said first annular groove, said first annular groove being communicable with said first fluid chamber via said fourth damping valve during a second piston stroke of said piston compressing said second fluid chamber;

means for defining a third annular groove;

said third damping valve closing said third annular groove, said third annular groove being communicable with said first fluid chamber via said third damping valve during said second piston stroke;

means for defining a second bypass passage establishing fluid communication between said third annular groove and said first fluid chamber; and a flow rate controlling valve fluidly disposed in said first and second bypass passages.

7. A damping valve assembly as claimed in claim 6, wherein said third annular groove defining means is disposed between said third and fourth damping valves.

8. A damping valve assembly comprising:

a cylinder tube with an internal space containing a working fluid;

a piston rod extending into said internal space and having a piston fixed thereto, said piston being disposed within said internal space to separate said internal space into a first fluid chamber and a second fluid chamber;

said piston having a bounding stroke communication path having one end in fluid communication with said second fluid chamber and an opposite end and a rebounding stroke communication path having one end in fluid communication with said first fluid chamber and an opposite end;

a first bounding stroke damping valve mounted to said piston and cooperating therewith to close fluid communication between said opposite end of said bounding stroke communication path and said first fluid chamber during a rebounding stroke wherein said piston moves in such a direction as to expand said second fluid chamber and compress said first fluid chamber, said first bounding stroke damping valve being operative to permit a flow of working fluid through said bounding stroke communication path from said second fluid chamber into said first fluid chamber during a bounding stroke wherein said piston moves in such a direction as to compress said second fluid chamber and expand said first fluid chamber;

means for defining a bounding stroke bypass passage having one end in fluid communication with said second fluid chamber and an opposite end;

a second bounding stroke damping valve cooperating with said bounding stroke bypass passage defining means to close fluid communication between said opposite end of said bounding stroke bypass passage and said first fluid chamber during said rebounding stroke, said second bounding stroke damping valve being operative to permit a flow of working fluid through said bounding stroke bypass passage from said second fluid chamber into said first fluid chamber during said bounding stroke;

a first rebounding stroke damping valve mounted to said piston;

a second rebounding stroke damping valve mounted to said piston and cooperating with said first rebounding stroke damping vale to define therebetween an annular space;

means for defining a rebounding stroke bypass passage having one end in fluid communication with said annular space and an opposite end in fluid communication with said second fluid chamber;

said first rebounding stroke damping valve cooperating with said piston to close fluid communication between said opposite end of said rebounding stroke communication path and said annular space during said bounding stroke, said second rebounding stroke damping valve cooperating with said piston to close fluid communication between said annular space and said second fluid chamber during said bounding stroke, said first rebounding stroke damping valve being operative to permit a flow of working fluid through said rebounding stroke communication path from said first fluid chamber into said annular space during said rebounding stroke, said second rebounding stroke damping valve being operative to permit a fluid communication between said annular space and said second fluid chamber; and valve means for closing said bounding stroke bypass passage and said rebounding stroke bypass passage, said valve means being operative to open said bounding stroke bypass passage and said rebounding stroke bypass passage.

* * * * *